May 28, 1929.   P. NAUMANN ET AL   1,714,615
SOLDERING IRON
Filed Dec. 24, 1927
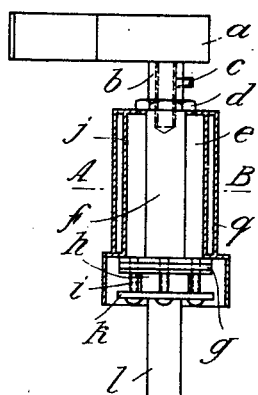
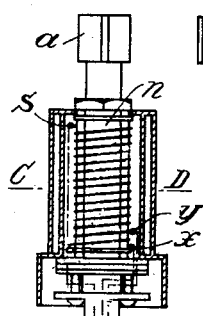
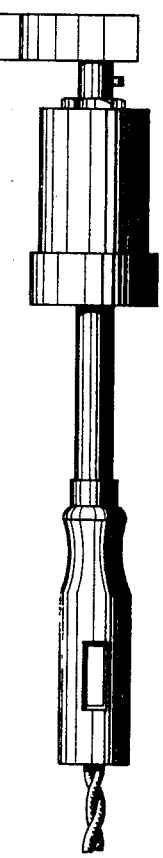
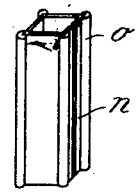
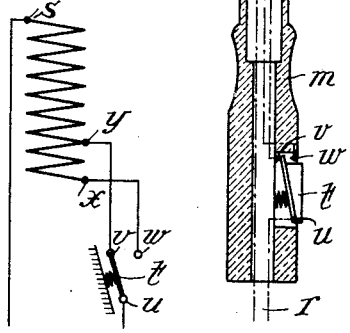
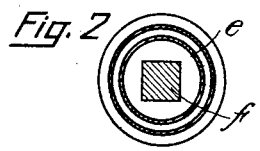
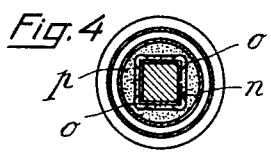
Inventors:
Kurt Weber
and Paul Naumann
By Carpenter
Atty.

Patented May 28, 1929.

1,714,615

UNITED STATES PATENT OFFICE.

PAUL NAUMANN, OF DRESDEN-BLASEWITZ, AND KURT WEBER, OF DRESDEN, GERMANY.

SOLDERING IRON.

Application filed December 24, 1927, Serial No. 242,369, and in Germany December 29, 1926.

Our invention relates to electric soldering irons, and more specifically to heavy duty soldering irons, and consists mainly in so designing the soldering or tipping iron that as high as possible a temperature is attained.

Our invention further consists in providing special means for mounting the heating resistance upon the heating core.

The heating resistance, according to our invention is freely supported within the soldering iron. We attain this result in surrounding the heating core with a metal shell preferably of rectangular shape and at the corners of which small pillars are provided. Around these pillars is wound the heating resistance, and the space between the heating resistance and the metal shell or envelope is preferably filled up with a fine-grained loose filling material in the form of a powder. The filling material encloses the heating resistance almost in an airtight manner and yet permits the expansion of the resistance wire without becoming displaced upon the support. This arrangement ensures an unrestricted heat dissipation and at the same time protects the entire heating system against contact with the air and acid vapors which may develop. Not only is this construction less expensive and safer in use but, the resistance is far more easily accessible for repairs than when the heating resistance is embedded in a solid ceramic material.

The filling material may be utilized as heat storage medium, when a substance is used which is capable of accumulating large quantities of heat. In this way it is possible to perform soldering operations at places where electric current is not available, or the connecting leads would become inconveniently long.

Also, the wasted heat communicated to the outer casing of the heating system may be reduced to a minimum, which is brought about by placing a double-walled jacket around the heating element, the space between the two walls of the casing being either filled with a bad conductor of heat, or evacuated. In this way the efficiency of the soldering iron may be considerably increased.

An embodiment of our invention is by way of example illustrated in the accompanying drawing, in which Fig. 1 is a sectional elevation of the soldering iron with the heating element removed, Fig. 2, a cross-section along line A—B of Fig. 1, Fig. 3, a sectional elevation of the iron, with the heating element in place, Fig. 4, a cross-section along the line C—D of Fig. 3, Fig. 5, a perspective view of the metal shell surrounding the heating core with the small corner pillars mounted upon its face, Fig. 6, the wiring diagram for the heating resistance and the connection of its tappings with the change-over switch, and Fig. 7, the soldering iron in elevation.

According to the drawings, $a$ is a copper tip provided with a threaded pin $b$ adapted to be screwed into a tapped bore of the heating core $f$. The pin $b$ may be locked in place by a set screw $c$. $d$ is a nut which keeps the casing $e$ surrounding the heating chamber in position. This casing $e$ is double walled and the space between the two walls is evacuated. The inner wall is indicated by the reference letter $j$ and the outer by $q$. The heating core $f$ is mounted upon a metal disc $g$ which is insulated and rests upon an insulating intermediate layer $h$ consisting of a bad conductor of heat. The heating chamber is joined by screws $i$ to the metal base $k$ into which opens the metal tube $l$. This tube terminates in a handle $m$.

The heating element consists of a longitudinally split metal shell $n$ closely fitting core $f$ but capable of expansion. On the surface of shell $n$ small pillars $o$ are provided, which may consist of soap-stone, or other equivalent refractory insulating material. The pillars may be attached by strip metal to the shell $n$. The heating wire is wound around the corner pillars in straight or spiral form and the complete heating element is then slipped over the heating core $f$. The heating chamber is filled with a powdered loose material (Fig. 4) which transmits the heat developed to the heating core $f$. The current is introduced through the hollow handle and one pole is connected with the terminal $s$, and the other with the switch $t$ at the terminal $u$. The switch $t$ is provided with two contacts $v$ and $w$ which are connected with the terminals $x$ and $y$. The manner of operation of the soldering iron will be understood by reference to the wiring diagram shown in Fig. 6. The supply lead within the iron is relieved of strains by clamping it between the insulating intermediate layer $h$ and the insulated disc $g$.

The heating core and the shell surrounding it is shown of square shape, but it may be polygonal or of round shape.

Various modifications and changes may be made without departure from the spirit and the scope of the invention, and we desire therefore, that only such limitations shall be placed thereon as are imposed by the prior art.

We claim as our invention:

1. In a heavy duty electric soldering iron, comprising a casing for the heating element, adapted to carry a soldering tip and provided with a handle, a metal shell, small pillars of insulating material mounted on said shell in spaced relation, and a heating resistance wound on said shell so as to rest on said pillars and providing space for a loose mass of powder embedding said resistance.

2. In a heavy duty electric soldering iron, comprising a casing for the heating element, adapted to carry a soldering tip and provided with a handle, a metal shell, small pillars of insulating material mounted on said shell in spaced relation, and a heating resistance wound about said shell so as to rest on said pillars and providing space for a loose mass of powder of heat storing material embedding said resistance.

3. In a heavy duty electric soldering iron, comprising a double-walled casing for the heating element, adapted to carry a soldering tip and provided with a handle, a metal shell, small pillars of insulating material provided on said shell in spaced relation, and a heating resistance wound about said shell and resting on said pillars.

4. In a heavy duty electric soldering iron, comprising a double-walled evacuated casing for the heating element, adapted to carry a soldering tip and provided with a handle, a metal shell, small pillars of insulating material provided on said shell, and a heating resistance wound about said metal shell so as to rest on said pillars and providing space for a loose mass of powder embedding said resistance.

In testimony whereof we affix our signatures.

PAUL NAUMANN.
KURT WEBER.